(12) United States Patent
Wohlfahrt et al.

(10) Patent No.: US 11,766,763 B2
(45) Date of Patent: Sep. 26, 2023

(54) CLAMPING OR GRIPPING DEVICE WITH EXTENDED STROKE

(71) Applicant: SCHUNK GmbH & Co.KG Spann-und Greiftechnik, Lauffen am Neckar (DE)

(72) Inventors: Jens Wohlfahrt, Bad Mergentheim (DE); Ralf Becker, Marbach (DE); Helge Schneider, Brackenheim (DE)

(73) Assignee: SCHUNK GmbH & Co.KG Spann-und Greiftechnik, Lauffen am Neckar (DE)

( * ) Notice: Subject to any disclaimer, the term of this patent is extended or adjusted under 35 U.S.C. 154(b) by 156 days.

(21) Appl. No.: 17/442,854

(22) PCT Filed: Mar. 17, 2020

(86) PCT No.: PCT/EP2020/057244
§ 371 (c)(1),
(2) Date: Sep. 24, 2021

(87) PCT Pub. No.: WO2020/193279
PCT Pub. Date: Oct. 1, 2020

(65) Prior Publication Data
US 2022/0176518 A1 Jun. 9, 2022

(30) Foreign Application Priority Data
Mar. 25, 2019 (DE) ...................... 10 2019 107 557.2

(51) Int. Cl.
*B25B 5/00* (2006.01)
*B25B 5/02* (2006.01)
(Continued)

(52) U.S. Cl.
CPC ................. *B25B 5/02* (2013.01); *B25B 5/06* (2013.01); *F16H 19/04* (2013.01)

(58) Field of Classification Search
CPC .... B25B 5/00; B25B 5/02; B25B 5/06; B25B 5/16
See application file for complete search history.

(56) References Cited

U.S. PATENT DOCUMENTS 4,707,013 A * 11/1987 Vranish .................. B25J 15/026
901/39
4,968,077 A * 11/1990 Redmon, Jr. ............ B65G 7/12
294/16
(Continued)

FOREIGN PATENT DOCUMENTS

CN          105538306 A     5/2015
CN          105538306 A     5/2016
(Continued)

OTHER PUBLICATIONS

CN Office Action, dated Jul. 26, 2022. pp. 1-6.
(Continued)

*Primary Examiner* — Lee D Wilson
(74) *Attorney, Agent, or Firm* — BOND SCHOENECK & KING, PLLC

(57) ABSTRACT

Clamping or gripping device with a main body, with guide portions provided on the main body, with jaws which are movable along the guide portions in a direction of movement, which can be moved between an inner stroke position and an outer end-of-stroke position, the jaws each having a row-of-teeth portion with, in each case, a length extending in the direction of movement, and with multiple pinions, the axes of rotation of which lie in a plane lying parallel to the respective row-of-teeth portions, the pinions interacting with the respective row-of-teeth portion to drive the jaws.

10 Claims, 7 Drawing Sheets

(51) Int. Cl.
*B25B 5/06* (2006.01)
*F16H 19/04* (2006.01)

(56) References Cited

U.S. PATENT DOCUMENTS

| | | | |
|---|---|---|---|
| 5,342,254 A | 8/1994 | Sula | |
| 6,428,071 B2* | 8/2002 | Bertini | ............... B25J 15/026 |
| | | | 294/207 |
| 10,766,106 B2* | 9/2020 | Wells | .................. B23P 19/02 |
| 2014/0138972 A1* | 5/2014 | Maffeis | ............ B25J 15/0253 |
| | | | 294/207 |
| 2015/0343646 A1 | 12/2015 | Drab et al. | |
| 2022/0176518 A1* | 6/2022 | Wohlfahrt | ............. B25B 1/02 |

FOREIGN PATENT DOCUMENTS

| | | |
|---|---|---|
| DE | 3921055 A1 | 4/1990 |
| DE | 202017004877 U1 | 12/2017 |
| DE | 102019107557 B4 | 10/2020 |

OTHER PUBLICATIONS

Text of First Office Action—pp. 1-2.
German Office Action, dated Feb. 13, 2020, pp. 1-4.
International Search Report and Written Opinion for PCT/EP2020/057244, dated May 14, 2020.

\* cited by examiner

CLAMPING OR GRIPPING DEVICE WITH EXTENDED STROKE

CROSS REFERENCE TO RELATED APPLICATIONS

This is a National Stage Application filed under 35 U.S.C. 371 based on International Patent Application No. PCT/EP2020/057244, filed on Mar. 17, 2020, which claims priority to German Patent Application 10 2019 107 557.2 filed Mar. 25, 2019. The entire disclosures of each of the foregoing are hereby incorporated herein by reference in their entireties.

BACKGROUND

The invention relates to a gripping or clamping device with a main body, with guide portions provided on the main body, in particular running parallel to one another, and with at least two jaws which are movable along the guide portions in the direction of movement and which can be moved between an inner stroke position and an outer stroke position. The inner stroke position can form a middle position between two outer end-of-stroke positions. The jaws each have a row-of-teeth portion with, in each case, a length l extending in the direction of movement. Furthermore, multiple pinions are provided, the axes of rotation of which lie in a plane lying parallel to the respective row-of-teeth portions, which interact with the respective row-of-teeth portion to drive the jaws. The axes of rotation of adjacent pinions are spaced apart from one another at a distance a.

In such gripping or clamping devices, jaw attachments, such as gripping fingers, are arranged on the jaws in order to be able to clamp or grip objects. By moving the jaws between the end-of-stroke positions, the jaw attachments can be moved in order to grip the objects from the inside or from the outside.

The gripping or clamping device mentioned at the beginning is known, for example, from DE 20 2017 004 877 U1 and U.S. Pat. No. 4,070,013. There, the pinions are continuously in engagement with the rows of teeth provided on the jaws during the entire travel movement of the jaws.

DE 39 21 055 A1 discloses a gripping tool in which, in each case, one spur gear is in engagement with a gear rack carriage that is connected to a gripping finger.

In the case of such gripping devices, it is desirable to provide the largest possible stroke, i.e., the largest possible travel movement, between the end-of-stroke positions. Nevertheless, a reliable functionality of the clamping and gripping device should be guaranteed.

SUMMARY OF THE INVENTION

This object is achieved with a clamping or gripping device. Consequently, it is particularly provided that the lengths s of the guide portions, the lengths l of the row-of-teeth portions and the distance a from the adjacent pinions are selected such that, in an outer end-of-stroke position, a pinion with only one row-of-teeth portion and another pinion interact with only the other row-of-teeth portion. In the outer end-of-stroke position, i.e., when the jaws are at their maximum distance from one another, at least one pinion interacts with only the row-of-teeth portion of one jaw, and another pinion interacts with only the row-of-teeth portion of the other jaw. Adjacent pinions consequently transfer the respective row-of-teeth portion to the next pinion until the outer end-of-stroke position is reached. In the respective outer end-of-stroke position, no longer do all pinions interact with row-of-teeth portions but instead at least one pinion is no longer in engagement with one row-of-teeth portion or at least one other pinion is no longer in engagement with the other row-of-teeth portion. In addition, at least two pinions interact with one row-of-teeth portion in one of the inner stroke positions, so that, in this inner stroke position, at least two pinions are simultaneously in engagement with one row-of-teeth portion. As a result, the stroke of the clamping or gripping device is increased in comparison with the known prior art.

In particular, the clamping or gripping devices can be designed as parallel grippers with, in that case, the row-of-teeth portions running parallel to one another, the axes of rotation of the pinions lying in a plane parallel to the respective row-of-teeth portion and the plane lying between the row-of-teeth portions then running parallel to one another. The invention is not limited to parallel grippers but also relates to centric grippers.

Depending on the type and structure of the clamping or gripping device, the inner stroke position can be an inner end-of-stroke position or a middle position between two outer end-of-stroke positions.

An advantageous embodiment results when the length l of the row-of-teeth portions is in a range of 1.0 to 2.0 times the distance a of the axes of rotation of adjacent pinions and preferably in a range of 1.1 to 1.5 times the distance a of the axes of rotation of the adjacent pinions. This can ensure that, when the jaws are moved in the direction of the outer end-of-stroke position, the row-of-teeth portions disengage with the rear pinion in the direction of movement or no longer interact with this rear pinion in the direction of movement.

The length s of the guide portions is advantageously in the range of 2 to 6 times and preferably in the range of 3 to 4 times, the length l of the row-of-teeth portions.

An advantageous embodiment provides that at least two pinions are provided with the row-of-teeth portions in the inner stroke position or the middle position preferably interacting with both pinions. The length l of the respective row-of-teeth portion can be somewhat greater than the distance a between the two pinions and, in particular, be in the range of 1.1 to 1.5 times the distance a. In the inner stroke position or the middle position, this ensures that the row-of-teeth portions interact with both pinions.

In a further embodiment it is provided that at least three pinions are provided with the row-of-teeth portions interacting with only the middle pinion in the middle position or the inner stroke position. If three pinions are provided, the respective adjacent pinions are preferably at the same distance a. In this embodiment, too, it is advantageous if the lengths l of the row-of-teeth portions are at least slightly greater than the distance between the pinions and lie, in particular, in the range of 1.1 to 1.5 times the distance a so that, when the jaws are moved out of the inner stroke position, the pinions hand over the row-of-teeth portions so that the row-of-teeth portions then each come into contact with one second pinion.

According to the invention, it is conceivable that not only 3 but 4, 5, 6 or more pinions are provided with an axis of rotation lying in a plane.

It is also advantageous if the individual pinions are each provided on a pinion portion on a respective shaft and if each shaft has a gear portion with a gear protruding from the associated pinion in the radial direction with two adjacent gears being able to be coupled in motion via a coupling gear. Overall, this results in an arrangement that saves space.

However, it is also conceivable that a coupling gear is provided directly between two pinions, i.e., that no extra gear portion is provided with a gear protruding in the radial direction. The coupling gear meshes with the pinions. It is also conceivable that a gear is provided on the respective shaft that does not protrude over the respective pinion or that is set back in the radial direction relative to the respective pinion.

To drive the pinion, a drive shaft with a drive pinion, which interacts with a gear or a coupling gear for driving the individual shafts, is advantageously provided. The drive shaft is preferably driven by a drive, for example, an electric motor, and it is also possible for a transmission gear to be provided between the drive shaft and the drive. However, other types of drives for the pinion can be provided as well; for example, the pinions can be driven by means of a chain drive or a drive belt.

Another advantageous embodiment provides that the guide portions are designed as guide strips with guide surfaces provided on two opposite side walls with the side walls with the guide surfaces being arranged to run parallel to the plane spanned by the axes of rotation of the pinions. In this way, a horizontal guide is realized, which makes it possible to save space in the axial direction.

It is also conceivable that the side walls with the guide surfaces are arranged in such a way that they run perpendicular to such a plane. This creates a vertical guide that is comparatively slim toward the center plane.

Further details and advantageous designs of the invention can be found in the following description, on the basis of which two embodiments of the invention are described and explained in more detail.

DETAILED DESCRIPTION

Figure 1:
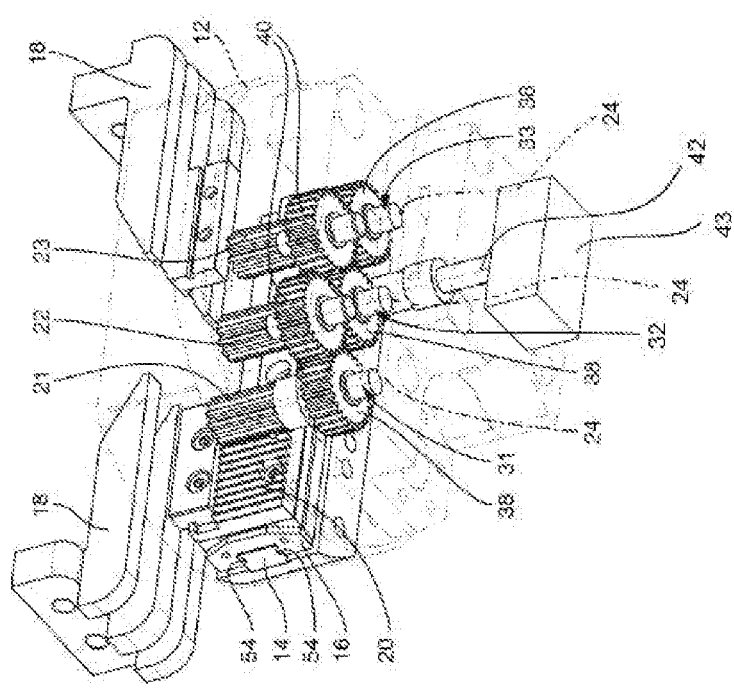
FIG. 1 is a gripping device viewed obliquely from below.

FIG. 1 is an illustration of a gripping device 10 comprising a main body 12 on which two guide portions 14 running parallel to one another are provided. The main body 12 is only indicated by dashed lines, and only one guide portion 14 is identified with a jaw 16 that is movable along the guide portion 14.

Figure 2:
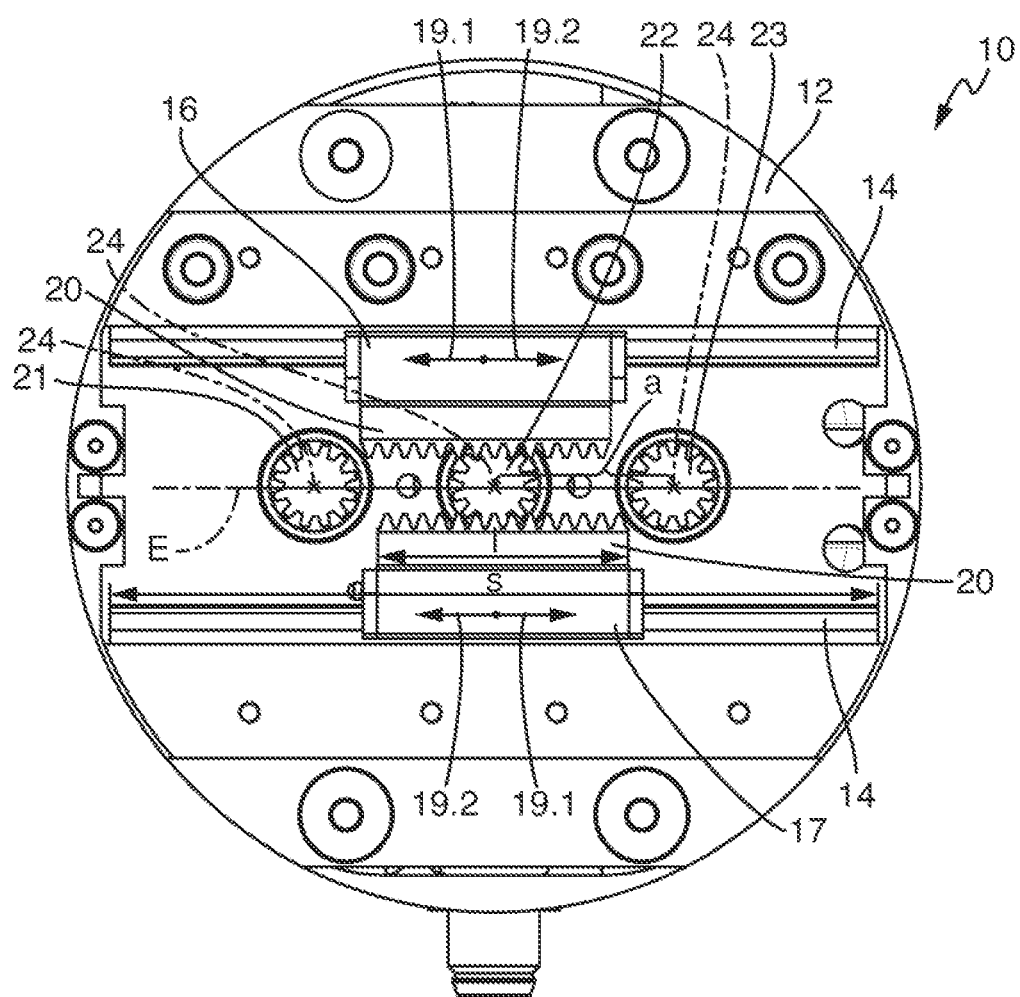
FIG. 2 is a cross section through the gripping device, according to FIG. 1, in a plane running through the jaws in the middle position or the inner stroke position of the jaws.
Figure 3:
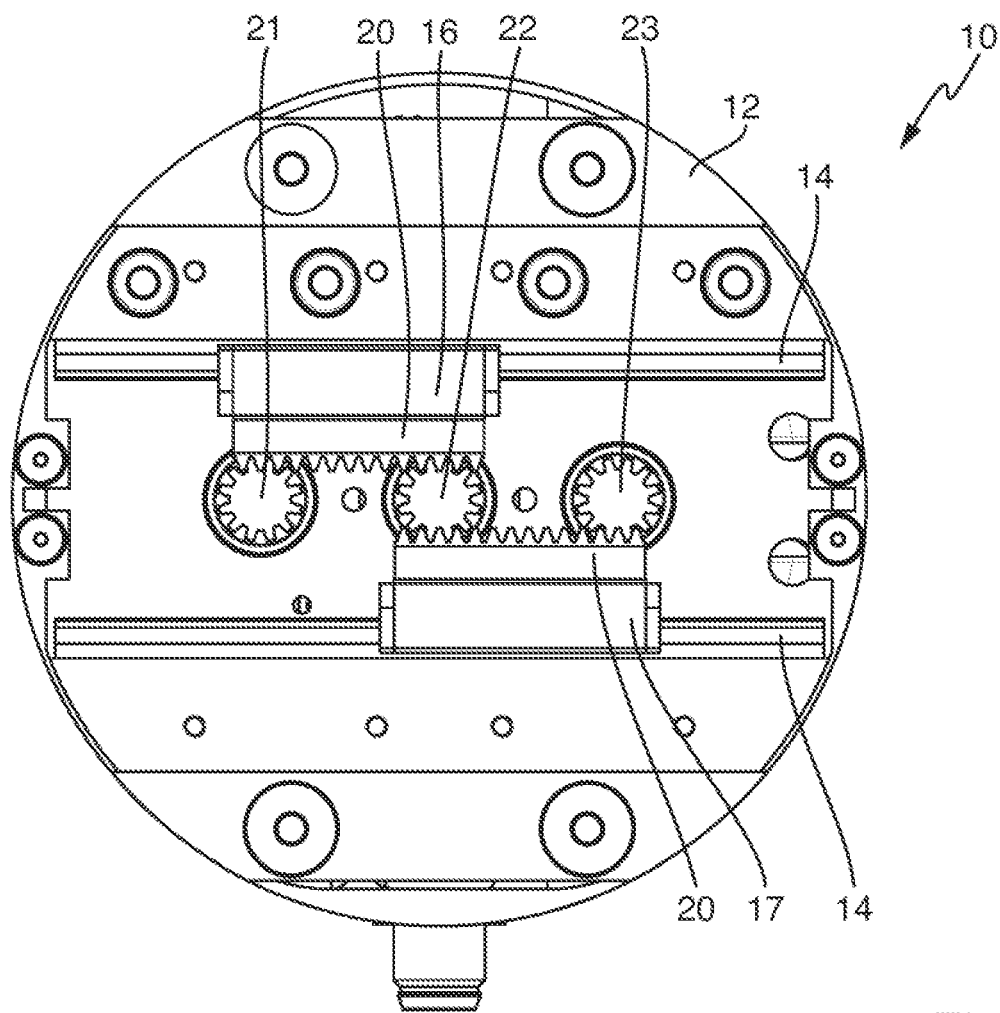
FIG. 3 is the section according to FIG. 2 in an intermediate stroke position.
Figure 4:
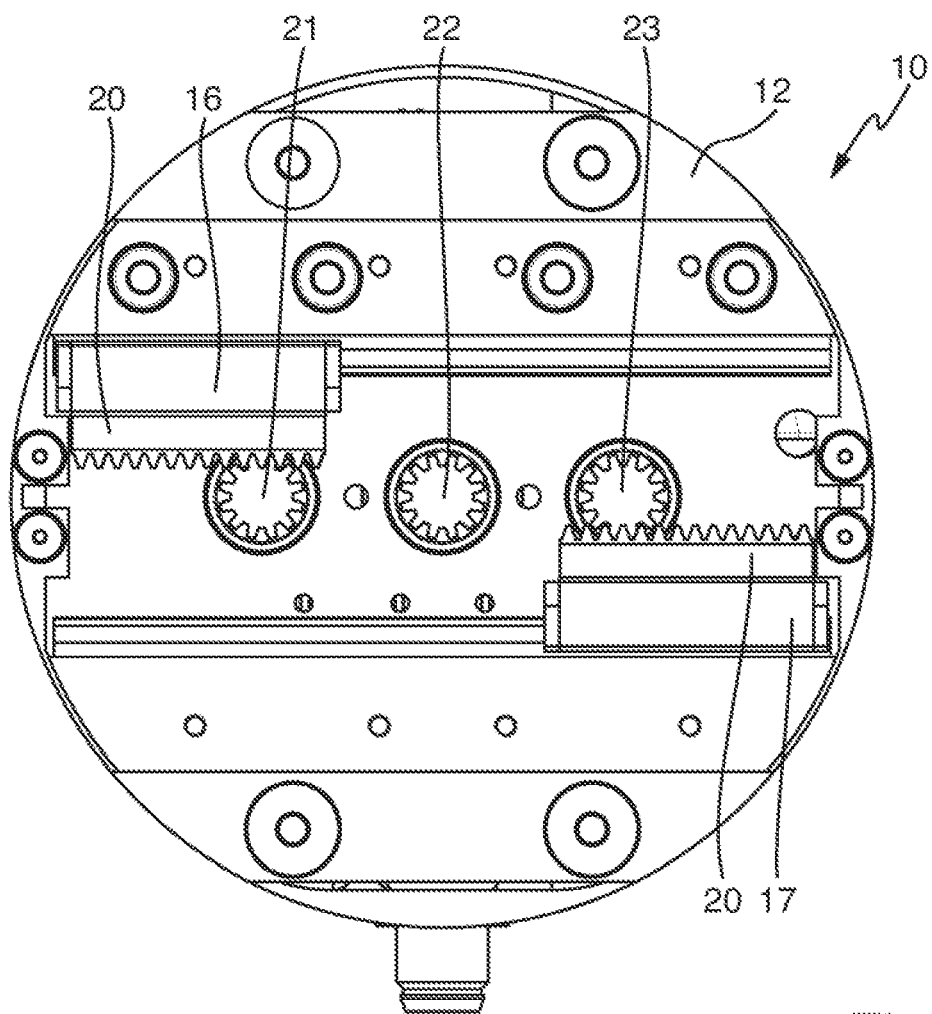
FIG. 4 is the section according to FIG. 2 in an outer end-of-stroke position.

The guide portions 14, which run parallel to one another, and the two jaws 16, 17 can be clearly seen in FIGS. 2 to 4. According to the invention, three jaws can also be provided, which are then arranged so that they can be moved centrally toward or away from one another.

In the illustration according to FIG. 1, top jaws 18 are shown which can be fastened to the jaws 16, 17. With the top jaws 18, components not shown in the figures can be gripped or clamped directly or with the interposition of gripping fingers.

The jaws 16, 17 are movably arranged on the guide portions 14 between a middle position or inner stroke position, as shown in FIG. 2, and two outer end-of-stroke positions, one of which is shown in FIG. 4. Starting from the middle position, the jaws 16, 17 can consequently, on the one hand, move in the respective direction of movement 19.1. into the outer end-of-stroke position shown in FIG. 4 and, on the other hand, in the respective movement direction 19.2 into a second, outer end-of-stroke position.

The two jaws 16, 17 each have row-of-teeth portions 20 on the sides facing each other. The row-of-teeth portions 20 each have a length l extending in the direction of movement 19. The guide portions 14 have a length s that is likewise extending in the direction of movement 19.

As is clear from FIGS. 1 to 4, the gripping device 10 has a total of three pinions 21, 22 and 23, the axes of rotation 24 of which are arranged in a center plane E lying parallel to the row-of-teeth portions 20 and also between the row-of-teeth portions 20. The axis of rotation 24 of the adjacent pinions 21, 22 and 23 each have a distance a. The jaws 16, 17 are ultimately moved from the middle position into the respective outer end-of-stroke position via an interaction of the pinions 21, 22 and 23 with the row-of-teeth portions 20.

As is clear from FIGS. 2, 3 and 4, the length l of the row-of-teeth portions 20 is selected such that it is in the range of 1.2 to 1.5 times the distance a. Furthermore, the length s of the guide portions is selected such that it is in the range of 2 to 6 times and preferably in the range of 3 to 4 times, the length l of the row-of-teeth portions 20. This means that, in the inner middle position shown in FIG. 2, only the middle pinion 22 interacts with both row-of-teeth portions 20 of the two jaws 16, 17. When the jaws 16, 17 are displaced in the direction of the one outer end-of-stroke position, the jaw 16 therefore first moves to the left in the direction of movement 19.1, and the jaw 17 moves to the right in the direction of movement 19.2, as shown in FIG. 3. In this intermediate stroke position, the pinions 21 and 22 interact with the row-of-teeth portion 20 of the jaw 16. The pinions 22 and 23 interact with the row-of-teeth portion 20 of the jaw 17. If the jaws 16 or 17 are moved further in the direction of movement 19.1 or 19.2, the middle pinion 22 is pulled out of the row-of-teeth portions 20 of the two jaws 16, 17.

The position of the pinions 21, 22, 23, their spacing a and the length l of the rows of teeth are advantageously selected such that the row-of-teeth portions 20 are then in engagement with two pinions 21, 22 or 22, 23 when the respective jaw 16, 17 is in the nominal gripping range. The nominal gripping range is the range in which the jaws 16, 17 are regularly located in order to grip objects. In this respect, it is ensured that, in this range, each row-of-teeth portion 20 and thus each jaw 16, 17 interacts reliably with two pinions 21, 22 and 22, 23 so that high gripping forces can be reliably transmitted as well.

In the outer end-of-stroke position shown in FIG. 4, the pinion 21 only interacts with the row-of-teeth portion 20 of the jaw 16, and the pinion 23 only interacts with the other row-of-teeth portion 20 of the jaw 17. The row-of-teeth portions 20 of the jaws 16 and 17 are consequently handed over to the outer pinions 21, 23 before the outer end-of-stroke position is reached. Overall, this results in an expansion of the maximum stroke and, at the same time, a compact gripping device.

Figure 5:
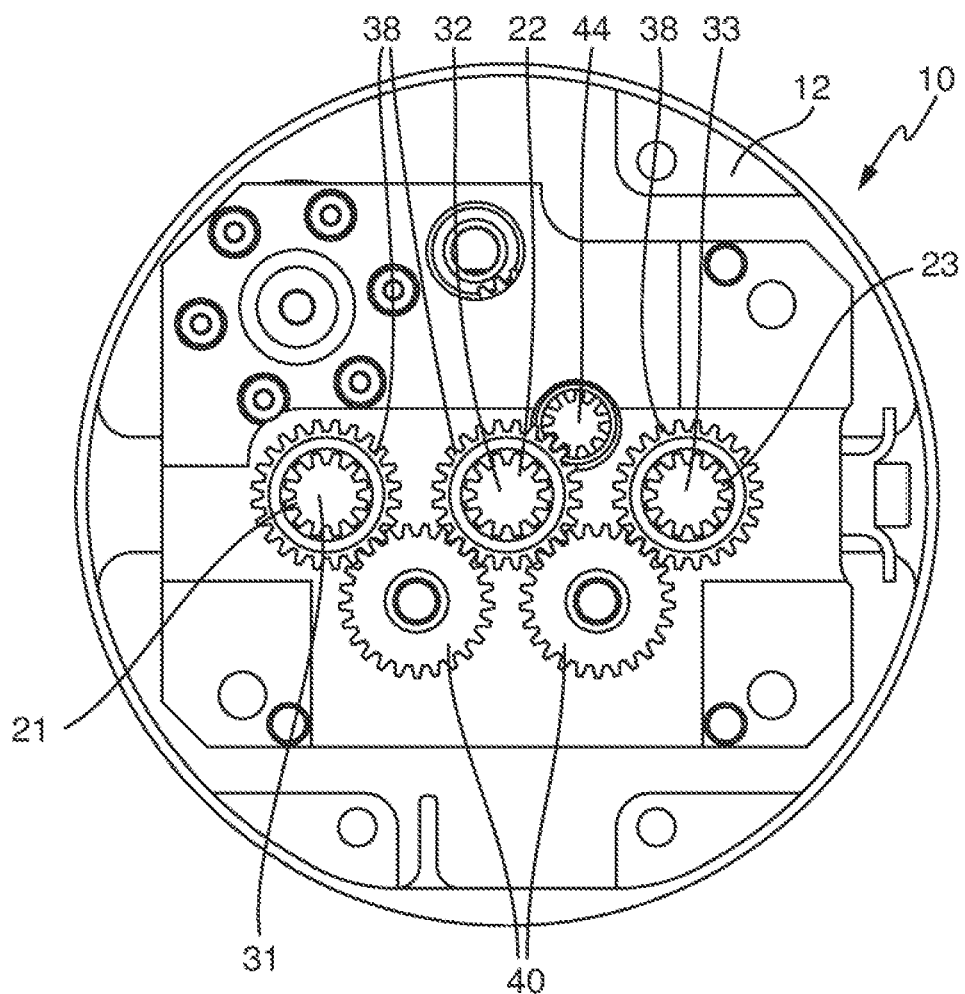
FIG. 5 is a cross section through the gripping device, according to FIG. 1, in a plane lying under the jaws.

FIG. 5 is an illustration of a cross section through the gripping device 10 in a plane which lies below the jaws 16, 17 or their row-of-teeth portions 20. The three pinions 21, 22 and 23, which, as is also clear from FIG. 1, are each provided on a shaft 31, 32 and 33, can be clearly seen. Each of the shafts 31, 32 and 33 not only has a respective pinion portion for the respective pinion 21, 22, 23 but also a gear portion on which one gear 38 each is provided. The gears 38 protrude from the respective pinions 21, 22, 23 in the radial direction. Coupling gears 40 are provided for the synchronous movement coupling of the shafts 31, 32, 33. As FIG. 1 makes clear, a drive shaft 42, which has a drive pinion 44 shown in FIG. 5, which interacts with the pinion 22, is provided to drive the pinions 21, 22, 23. The drive shaft 42 is driven, in particular, by an electric motor 43, and it is possible for one or more gear units to be provided between the drive shaft 42 and the driven shaft of the electric motor 43.

In an embodiment that is not shown, it is conceivable that the coupling gears 40 do not engage in a gear 38 formed separately from the respective pinion 21, 22, 23 but instead interact directly with the respective pinion 21, 22, 23. The axes of rotation of the coupling gears 40 can, in particular, also lie in the plane E.

Figure 6:
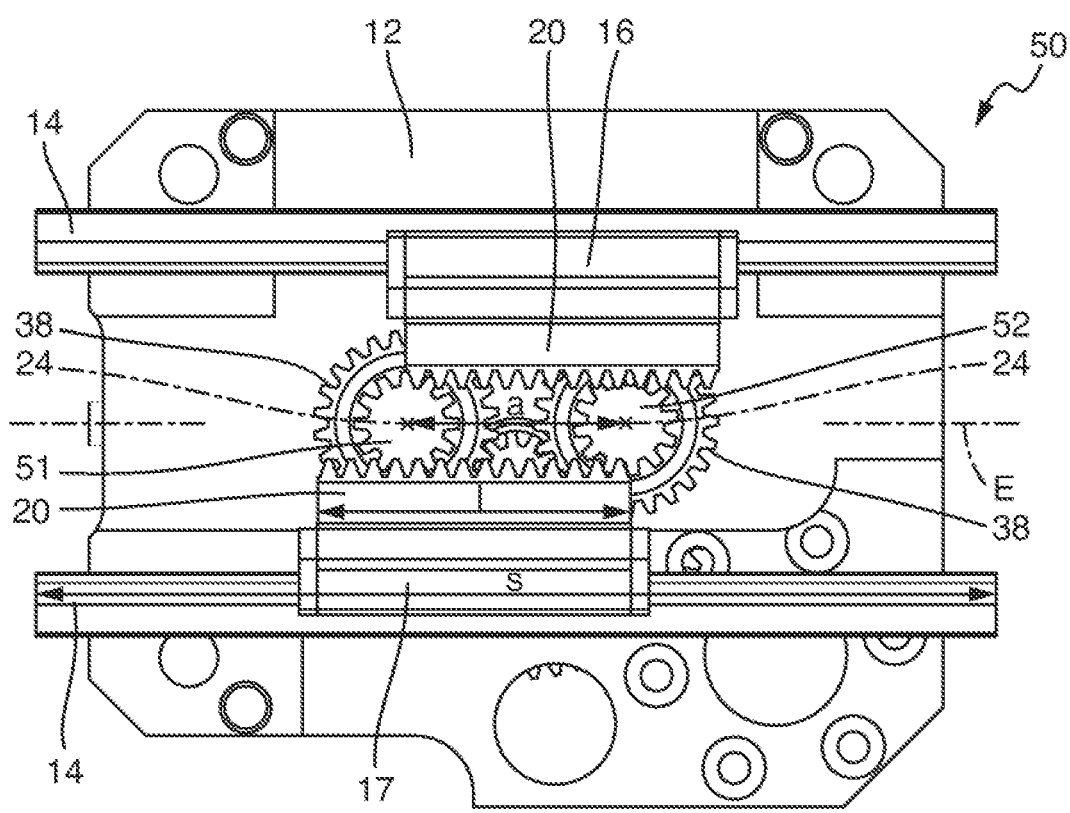
FIG. 6 is a cross section through a second embodiment of a gripping device in a plane running through the jaws in the middle position or inner stroke position and FIG. 7 is a cross section corresponding to FIG. 6 in an outer end-of-stroke position.
Figure 7:
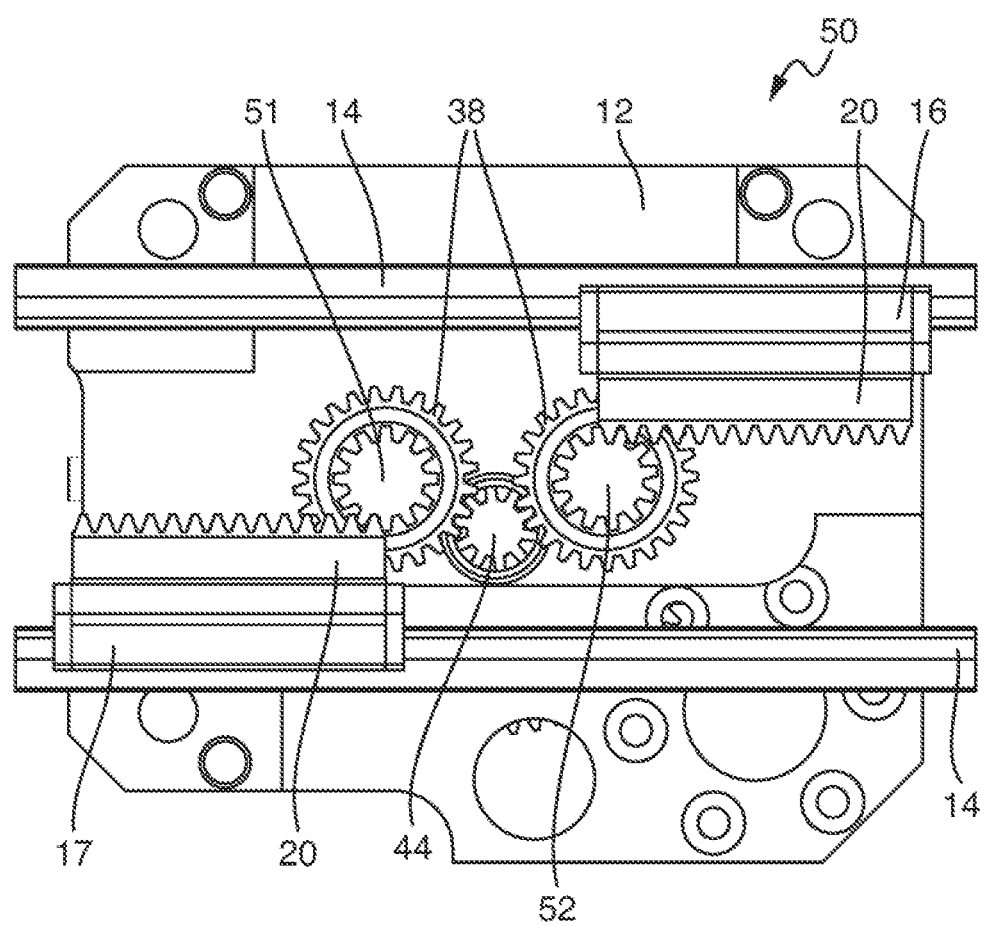

In FIGS. 6 and 7, a gripping device 50 is shown which, in contrast to the gripping device 10 according to FIGS. 1 to 5, has only two pinions 51 and 52. Components corresponding to the gripping device 10 are provided with corresponding reference numerals.

As in the case of the gripping device 10, the pinions 51, 52 are each located on a shaft on which a larger gear 38 is provided in addition to the respective pinion 51, 52. The two gears 38 mesh with the drive pinion 44.

As is clear from FIG. 6, the arrangement in the middle position or inner stroke position is such that the row-of-teeth portions 20 of both jaws 16, 17 are in engagement with the respective pinion 51, 52. The length l of the row-of-teeth portions 20 is typically in the range from 1.2 to 1.5 times the distance a between the axes of rotation 24 of the two pinions 51, 52.

In the one outer end-of-stroke position shown in FIG. 7, the arrangement is such that only one pinion 51, 52 interacts in each case with only one of the row-of-teeth portions 20. Furthermore, the arrangement is such that the pinions 51, 52 are only in engagement with the last, inner teeth of the row-of-teeth portions 20. In the other end-of-stroke position, not shown, the respective other pinion 50, 51 is in operative connection with the respective other row-of-teeth portion 20.

As is clear from FIG. 1, the guide portions 14 are designed as guide strips with guide surfaces 54 provided on two side walls facing away from one another. The side walls with the guide surfaces 54 are arranged such that they run perpendicular to the plane E in the embodiment shown. In this way, a vertical guide is realized, which makes it possible to save space in the radial direction. However, it can also be provided that the side walls with the guide surfaces 54 are arranged such that they run parallel to the plane E, which causes a horizontal guide to be realized which is comparatively slim in the axial direction.

The gripping devices 10 and 50 have the advantage that they have a significantly larger jaw stroke compared to known gripping devices, whereby the row-of-teeth portions 20 each interact with one different number of pinions when the jaws 16, 17 are moved from the middle position or inner stroke position into the respective outer end-of-stroke position. Adjacent pinions 21, 22, 23 or 51, 52 consequently hand over the respective row-of-teeth portion 20 to the next pinion until the outer end-of-stroke is reached. In the respective outer end-of-stroke position, only one pinion 21, 23 or 51, 52 interacts with only one row-of-teeth portion 20.

The invention claimed is:

1. A clamping or gripping device comprising a main body, guide portions provided on the main body, jaws which are movable along the guide portions in a direction of movement, which can be moved between an inner stroke position and an outer end-of-stroke position, the jaws each having a row-of-teeth portion with, in each case, a length extending in the direction of movement, and clamping or gripping device further comprising multiple pinions, the axes of rotation of which lie in a plane lying parallel to the respective row-of-teeth portions, wherein the pinions are driven by a drive, the pinions interacting with the respective row-of-teeth portion to drive the jaws, the axes of rotation of the pinions being spaced apart at a distance from one another, wherein the lengths of the guide portions, the lengths of the row-of-teeth portions and the distance a between the adjacent pinions being chosen such that, in the outer end-of-stroke position, one pinion interacts with only one row-of-teeth portion and another pinion interacts with only the other row-of-teeth portion, and in that at least two pinions interact with one row-of-teeth portion in one of the inner stroke positions.

2. The clamping or gripping device according to claim 1, wherein the length of the row-of-teeth portions is in the range of 1.0 to 2.0 times the distance a between the axes of rotation of adjacent pinions.

3. The clamping or gripping device according to claim 1, wherein the length of the guide portions is in the range of 2 to 6 times the length 1 of the row-of-teeth portions.

4. The clamping or gripping device according to claim 1, wherein two pinions are provided with the row-of-teeth portions in the inner stroke position interacting with both pinions.

5. The clamping or gripping device according to claim 1, wherein three pinions are provided with the row-of-teeth portions in the inner stroke position interacting only the middle pinion.

6. The clamping or gripping device according to claim 1, wherein each pinion is provided on a shaft and that each shaft comprises a gear which protrudes from the associated pinion in the radial direction.

7. The clamping or gripping device according to claim 1, wherein two adjacent gear wheels are coupled to one another in terms of movement via a coupling gear.

8. The clamping or gripping device according to claim 6, wherein a drive shaft is provided with a drive pinion which interacts with a gear or a coupling gear for driving the shafts.

9. The clamping or gripping device according to claim 1, wherein the guide portions are designed as guide strips with guide surfaces provided on two side walls facing away from one another, with the side walls with the guide surfaces being arranged to run parallel to a plane spanned by the axes of rotation of the pinions.

10. The clamping or gripping device according to claim 1, wherein the guide portions are designed as guide strips with guide surfaces provided on two side walls facing away from one another, with the side walls with the guide surfaces being arranged to run perpendicular to a plane spanned by the axes of rotation of the pinions.

* * * * *